Patented Oct. 25, 1938

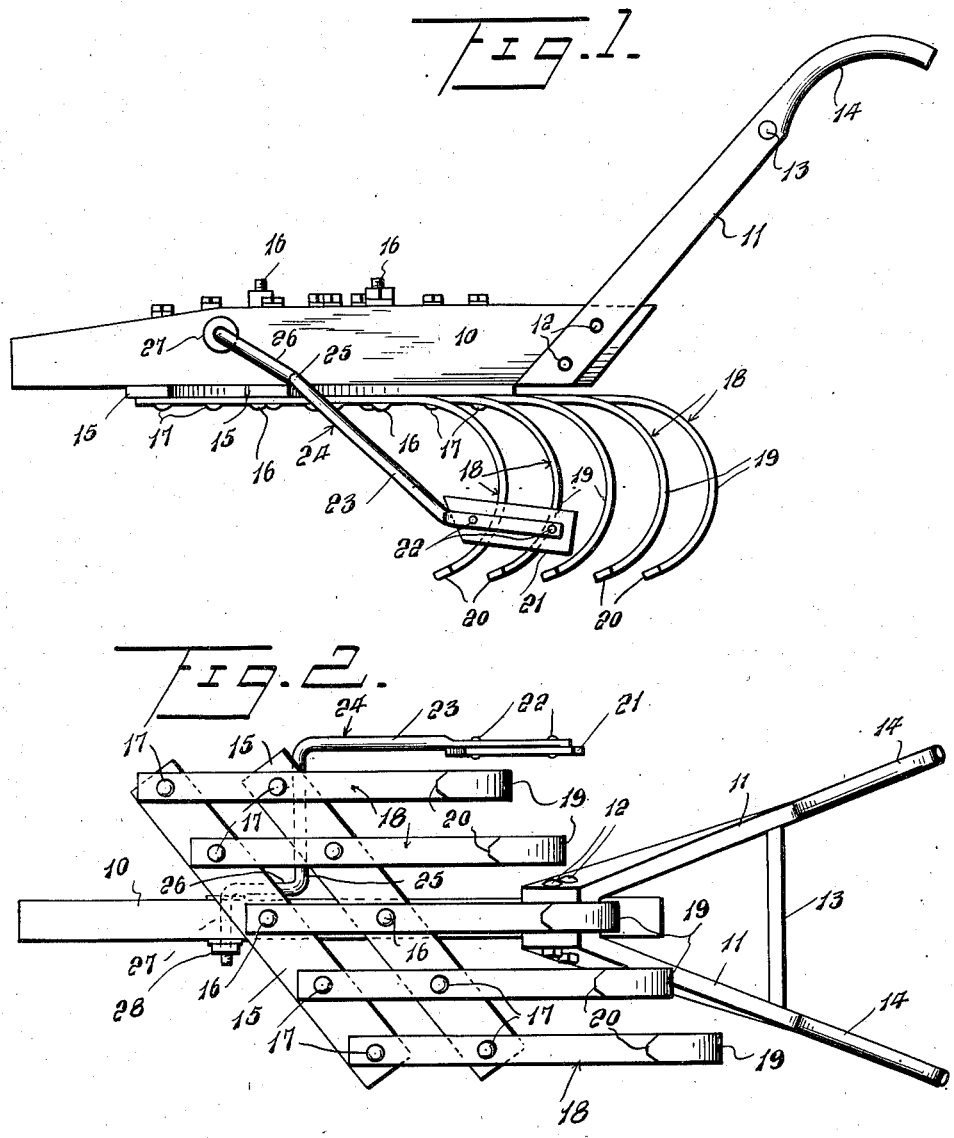

2,134,611

UNITED STATES PATENT OFFICE 2,134,611

SIDE HARROW

Joseph Homer Hudson, Prentiss, Miss.

Application November 25, 1936, Serial No. 112,816
Renewed March 24, 1938

2 Claims. (Cl. 55—33)

This invention relates to a side harrow and it is aimed to provide a novel adjustable construction which will more efficiently cultivate the soil and one which has a fender of novel form, effective at all adjustments to prevent the soil from covering small plants, and which fender will raise automatically according to the contour of the ground.

The more specific objects and advantages will become apparent from a consideration of the description following taken in connection with accompanying drawing illustrating an operative embodiment.

In said drawing—

Figure 1 is a view in side elevation of the improved harrow, and

Figure 2 is an inverted or bottom plan view thereof.

Referring specifically to the drawing wherein like reference characters designate like or similar parts, a central beam is shown at 10 adapted to be drawn forwardly in the usual manner by tractor or animal power. At the rear end, handlebars 11 are fastened at 12 and they preferably diverge in an upward direction, being braced as at 13, and terminating in handles 14.

Diagonal bars 15 in parallelism, are adjustably and pivotally secured to the beam 10 by bolts 16, the bolts being normally rigid securing the bars 15 in the different adjusted positions and being loosened to vary such positions.

Adjustably fastened to the bars 15 by means of said bolts 16 and additional bolts as at 17 are harrowing members 18, preferably made of bar steel and having arcuate teeth 19 at their rear ends sharpened as at 20 for harrowing engagement with the soil. It will be clear that with the various bolts 17 and 16 loosened, bars 15 may be arranged at various desired angles with the harrow members 18, different distances apart.

A fender is provided in the form of a vertically disposed plate 21 located adjacent one of the outermost harrow members in order to prevent the soil from covering small plants adjacent thereto, while harrowing. Fender 21 is bolted or otherwise secured as at 22 to a side arm 23 of a fender mounting 24. This mounting is preferably made of rod form and extending from the arm 23 is a lateral arm 25 from which a crank 26 extends in parallelism to the arm 23 but on opposite sides to the portion 25, and terminating in a journal 27 detachably and pivotally mounted in an opening in the beam 10 by means of a bolt 28.

The arm 25 is so disposed that regardless of the angularity of the crossbars 15, the arm 23 will be maintained in proper position for the fender 21 to coact with the harrow members to prevent the soil from covering small plants. It will also be noted that the fender is free to yield vertically on the axis of the journal, in traveling over uneven ground or should an obstruction be encountered. However, its portion 25 normally rests on one of the crossbeams, thereby gauging its operative position.

Various changes may be resorted to provided they fall within the spirit and scope of the invention.

I claim as my invention:

1. A harrow of the class described having a beam, bars bolted thereto in parallelism for adjustment to different positions, harrow members adjustably bolted to the bars, so that the adjustment of the bars will vary the positions of the harrow members, a fender to prevent harrowed soil from covering small plants disposed adjacent one of the harrow members, a mount carrying said fender, means pivotally connecting the mount to the beam, and said mount having a portion resting on one of the bars to govern its operative position.

2. A harrow of the class described having a beam, bars bolted thereto in parallelism for adjustment to different positions, harrow members adjustably bolted to the bars, so that the adjustment of the bars will vary the positions of the harrow members, a fender to prevent harrowed soil from covering small plants disposed adjacent one of the harrow members, a mount carrying said fender, means pivotally connecting the mount to the beam, and said mount having a portion resting on one of the bars to govern its operative position, said mount also having an arm carrying said fender, an arm parallel thereto and extending from the opposite side of said portion, and a journal extending from the last mentioned arm and having a nut operatively securing it to the beam.

JOSEPH HOMER HUDSON.